(No Model.)

W. T. ROSS.
THILL COUPLING.

No. 390,256. Patented Oct. 2, 1888.

Witnesses:
John Grist
John Hardie

Inventor:
W. T. Ross
By Henry Grist
Attorney.

N. PETERS, Photo-Lithographer, Washington, D. C.

UNITED STATES PATENT OFFICE.

WALTER T. ROSS, OF QUEBEC, QUEBEC, CANADA.

THILL-COUPLING.

SPECIFICATION forming part of Letters Patent No. 390,256, dated October 2, 1888.

Application filed April 18, 1888. Serial No. 271,005. (No model.)

*To all whom it may concern:*

Be it known that I, WALTER T. ROSS, of the city of Quebec, in the Province of Quebec, in the Dominion of Canada, have invented certain new and useful Improvements in Thill-Couplings; and I do hereby declare that the following is a full, clear, and exact description of the same, reference being had to the accompanying drawings, in which—

Figure 1:
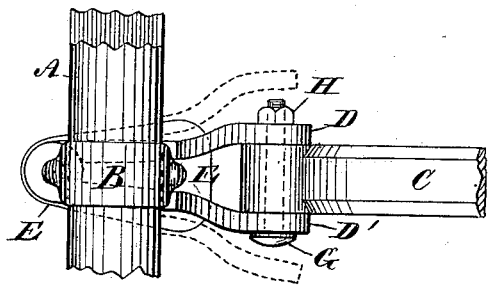
Figure 2:
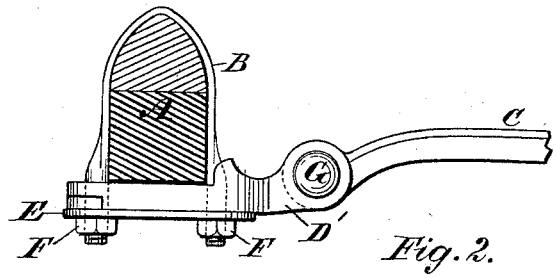
Figure 3:
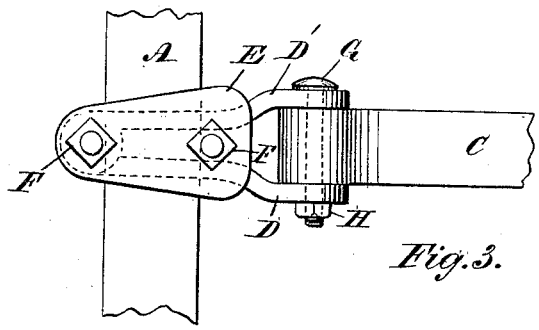

Figure 1 is a top view of my improved thill-coupling. Fig. 2 is a side elevation of the same; and Fig. 3 is a plan of Fig. 1, inverted.

The object of my invention is to construct a thill-coupling in which two jaws are movable to accommodate interveningly different sized thill irons with the same degree of uniformity, and coupling is effected without twisting the thills to insert the coupling-bolt.

My invention consists of a thill-coupling having two movable coupling jaws hinged together at the rear ends by one leg of a clip, which secures the coupling to the axle. The other leg of the clip intervenes the jaws, and both legs pass through a plate which supports said jaws. The front end of the jaws is provided with a hole to connect the thill-iron by a coupling-bolt, whereby both jaws will open apart to admit interveningly a thill-iron of larger or smaller size and the bolt be parallel to the axle of the vehicle when the draft is applied.

A is the axle of a vehicle, B the axle-clip, and C the thill-iron.

D D' are coupling jaws hinged together at the rear end by one leg of the clip passing through a hole at the joint and through a clip-plate, E. The other leg of the clip intervenes the jaws and passes through the clip plate, and both legs are provided with a nut, F, to clamp the thill coupling to the axle.

The jaws D D' open apart from their hinged connection, as shown by dotted lines in Fig. 1, to receive interveningly the head of the thill-iron C.

G is the coupling-bolt passing though a hole in said jaws and head, and H is a nut screwing on said bolt. The jaws, being movable, will admit any length of head on a thill-iron, and when the nut is screwed to clamp the jaws against said head rattling will be prevented.

I claim as my invention—

The combination, with the axle-clip B, of the movable coupling-jaws D D', hinged together at the rear ends by one leg of the clip, the other leg of the clip intervening said jaws, both legs passing through a plate, E, and provided with a nut, F, and a coupling-bolt, G, inserted in a hole at the front end of the jaws and provided with a nut, H, as set forth.

WALTER T. ROSS.

Witnesses:
JOHN STRANG,
  *Of the City of Quebec, Notary Public.*
THOS. O'NEILL,
  *Of the City of Quebec, Ship Chandler.*